United States Patent [19]
Schubert et al.

[11] 3,727,624
[45] Apr. 17, 1973

[54] FLUIDIC CIRCUIT COUPLING ARRANGEMENT

[75] Inventors: Gunther Schubert; Siegfried Muller, both of Dresden; Wolfgang Gobel, Moritzburg; Christian Hahn, Dresden, all of Germany

[73] Assignee: Veb Kombinat Mess-und Regelungstechnik Dessau, Dessau, Germany

[22] Filed: May 19, 1971

[21] Appl. No.: 144,942

[52] U.S. Cl. .......... 137/81.5
[51] Int. Cl. .......... F15c 1/12, F15c 1/18
[58] Field of Search .......... 137/81.5

[56] References Cited

UNITED STATES PATENTS

| | | | |
|---|---|---|---|
| 3,258,023 | 6/1966 | Bowles | 137/81.5 |
| 3,613,707 | 10/1971 | Heath | 137/81.5 |
| 3,348,773 | 10/1967 | Ahern | 137/81.5 X |
| 3,429,322 | 2/1969 | Metzger | 137/81.5 |
| 3,557,815 | 1/1971 | Lazar | 137/81.5 |
| 3,565,091 | 2/1971 | Auger | 137/81.5 |
| 3,574,309 | 4/1971 | Kinner | 137/81.5 |
| 3,595,258 | 7/1971 | Kinner | 137/81.5 |
| 3,610,267 | 10/1971 | Warren | 137/81.5 |
| 3,632,967 | 1/1972 | Moss et al. | 137/81.5 |

*Primary Examiner*—Samuel Scott
*Attorney*—Nolte & Nolte

[57] ABSTRACT

A fluidic circuit in which a turbulence amplifier has a plurality of inputs, and the output of the turbulence amplifier is coupled either directly or by way of suitable adapters to the control input of a fluidic logic device of the type having a wall diffuser.

3 Claims, 1 Drawing Figure

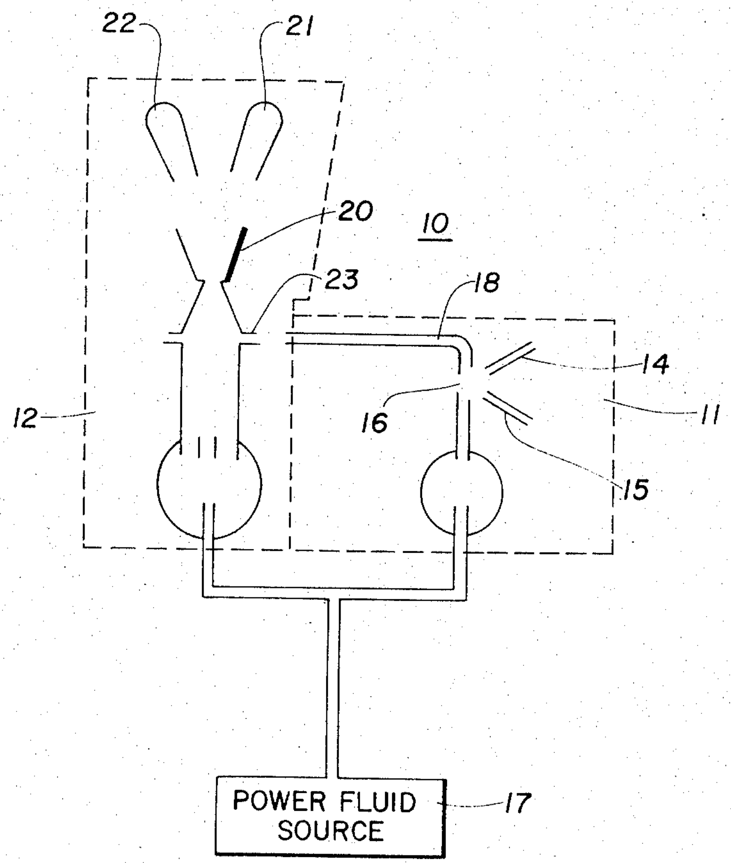
INVENTORS
GÜNTHER SCHUBERT
SIEGFRIED MÜLLER
WOLFGANG GÖBEL
CHRISTIAN HAHN
BY
Nolte & Nolte
ATTORNEY

FLUIDIC CIRCUIT COUPLING ARRANGEMENT

This invention relates to fluidic circuits, and it is particularly directed to the combination of a turbulence amplifier and a fluid logic device of the type having a diffuser wall. Such fluid logic devices will be referred to hereinafter as "wall jet switches." The coupling arrangement according to the invention may be affected on coupling cards, or by employing any other form of suitable coupling arrangements.

In the past, fluidic systems have been employed in which a plurality of wall jet switches have been coupled together, and systems of interconnected turbulence amplifiers are also known, for serving desired logic functions. Such previously employed arrangements have the disadvantage that it was only possible to intercouple a limited number of devices, and that operation of the systems with undecoupled inputs, as in the case of intercoupled wall jet switches, was not possible. In addition, the air consumption in such arrangements was undesirably high.

It is therefore an object of this invention to provide a system for intercoupling fluidic devices that overcomes the above disadvantages of previous known systems, and to provide a system that has the advantages of both types of jet elements.

According to the invention, the output of a turbulence amplifier is connected to the input of a wall jet switch either directly, or by means of corresponding coupling adapters. In other words, the outlet channel of the turbulence amplifier is oriented so that it feds directly or by way of suitable adapters into the input channels of the wall jet switch. The turbulence amplifier has a plurality of decoupled inputs, and these decoupled inputs form the input of the system. When the two types of jet elements are combined in this manner, it is thus possible to provide several decoupled inputs to the system, and it is also possible to operate a greater number of elements from the output of the combined device according to the invention then was possible in previously employed systems in which identical elements were intercoupled.

The invention will now be disclosed in greater detail with reference to the accompanying drawing, which schematically illustrates an intercoupled turbulence amplifier and wall jet switch in accordance with the invention.

Referring now to the drawing, therein is illustrated a fluidic circuit 10 comprised of a turbulence amplifier including the elements in dashed block 11, and a wall jet switch including the elements disposed within the dashed block 12. The turbulence amplifier and wall jet switch may be disposed in the conventional manner on a coupling card or other conventional units.

The turbulence amplifier has a plurality of control inputs, such as inputs 14 and 15, directed toward a mixing zone 16. A fluid, such as air, from a power fluid source 17 is directed in conventional fashion to the mixing zone 16, and an outlet 18 is provided extending from the mixing zone 16, so that in the absence of input pressure on the inputs 14 and 15, air from the fluid source 17 is directed straight through the mixing zone and into the outlet 18.

The wall jet switch 12 is also connected to the fluid source 17, and includes a diffuser wall 20, means for directing the power fluid to form a main jet, an output 21 positioned to receive fluid pressure when the main jet has its preferential position against the diffuser wall, and an outlet 22 positioned to receive pressure when the main jet is directed away from the wall 20. The wall jet switch also has a control input 23 positioned to control the position of the main jet.

In the operation of the above described device, assume initially that no input pressure is applied to the inputs 14 and 15 of the turbulence amplifier. Air from the source 17 will therefore pass through the mixing zone 16 of the turbulence amplifier and produce an output pressure in the output 18. Using the nomenclature that the absence of pressure corresponds to a "0" signal, and the presence of air pressure corresponds to a "1" signal, a "1" signal in output line 18 is applied to the control input 23 of the wall jet switch, thereby displacing the main jet from the wall 20, to effect a "1" signal output at the output 22 of the wall jet switch, and a "0" signal in the output 21 of the wall jet switch.

If a "1" signal is applied to either or both of the inputs 14 and 15 of the turbulence amplifier, the resultant turbulence in the mixing zone 16 of the turbulence amplifier results in the absence of output pressure in the output line 18. Consequently, the main jet in the wall jet switch 12 will assume its preferential position on the diffuser wall 20, to provide a "1" signal output at the output 21, and a "0" signal output at the output 22.

In the above described arrangement the wall jet switch is of the OR/NOR type, but it will be apparent that other types of wall jet switches, such as storage devices, may also be employed according to the teaching of the invention.

In the arrangement according to the invention, it is apparent that a plurality of decoupled inputs, i.e., inputs to the turbulence booster, may be employed, and it is further apparent that a plurality of devices of the type above disclosed may be intercoupled without the disadvantages inherent in the intercoupling of elements of the same type.

What is claimed is:

1. A fluidic circuit comprising a turbulence amplifier having a plurality of inputs and an output, a wall jet switch having a control input and a plurality of outputs, and means matching the output of the turbulence amplifier to the control input of said wall jet switch.

2. A fluidic circuit comprising a coupling unit, a turbulence amplifier and a wall jet switch on said coupling unit, said turbulence amplifier having an output and a plurality of inputs, said wall jet switch having an input and a plurality of outputs, and means matching the output of said turbulence amplifier to the input of said wall jet switch, whereby the output of said wall jet switch may be selectively controlled by the inputs of said turbulence amplifier.

3. The fluidic circuit of claim 2 wherein the output of said turbulence amplifier is directly connected to the input of said wall jet switch, and the inputs of said turbulence amplifier are not operatively intercoupled.

* * * * *